July 27, 1943.  H. A. REYNOLDS  2,325,427
HEATER AND WINDSHIELD DEFROSTER
Filed Dec. 16, 1939
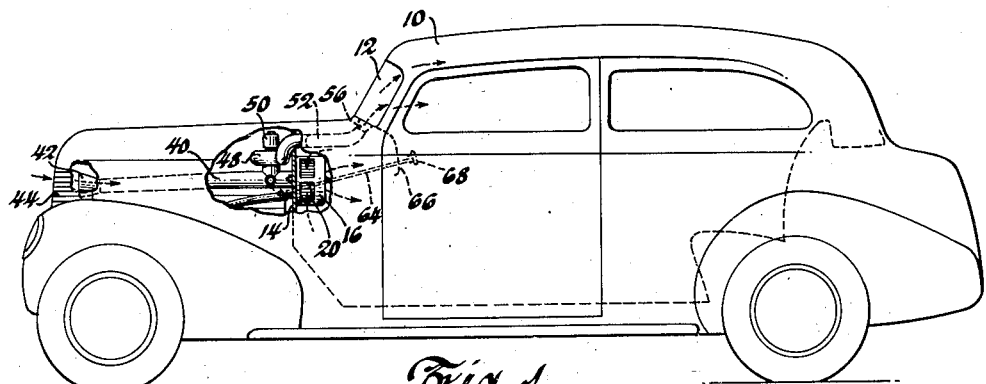
Fig. 1
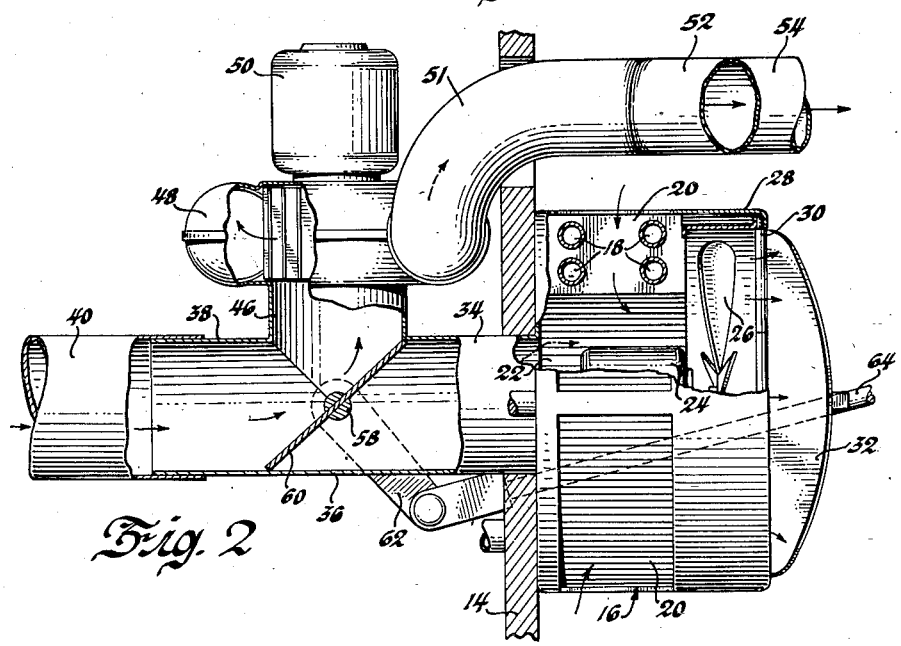
Fig. 2
Fig. 3
Fig. 4
Inventor
Harold A. Reynolds
By Blackmore, Spencer & Hurt
Attorneys Patented July 27, 1943

2,325,427

UNITED STATES PATENT OFFICE 2,325,427

HEATER AND WINDSHIELD DEFROSTER

Harold A. Reynolds, Lockport, N. Y., assignor to General Motors Corporation, Detroit, Mich., a corporation of Delaware Application December 16, 1939, Serial No. 309,565

3 Claims. (Cl. 98—2)

This invention relates to vehicle heating and windshield defrosting devices, and has for an object the provision of such a device which is capable of use in many different manners to permit heating or ventilation of the space within the car body or defrosting of the windshield with either recirculated air taken from within the body or fresh air taken from outside the car body.

Another object is to provide such a device wherein the pressure of the outside air being forced into the device by the forward movement of the car may be utilized to defrost the windshield or to heat the interior of the car, without requiring the operation of an electrically driven fan, thereby reducing the current drain on the car battery. Such a fan is provided, however, in connection with the heater part of the structure, for use when the heater is first turned on and when it is desired to heat the interior of the vehicle quickly, and for use when the vehicle is traveling slowly or standing still, or in extremely cold weather. A blower is provided in connection with the windshield defrosting and ventilating part of the structure, for the purpose of increasing the amount or the rate of flow of the air being used for defrosting the windshield or ventilating the interior of the body, when the quantity of outside air being forced in by the forward movement of the vehicle is insufficient for those purposes.

A further object is to so construct the device that it will occupy a minimum of space within the body compartment of the vehicle. This is accomplished by locating the defrosting part of the structure in the engine compartment and connecting it to the heating part of the device, which is located in the body compartment, by a tube which extends through the dash. The result of this is that the defrosting part of the device does not occupy any of the space within the car body, and the heating part of the structure may be made of adequate size to properly heat the interior of the vehicle without occupying too much space in the body compartment.

Other objects and advantages will be apparent upon reference to the specification and accompanying drawing, in which:

Fig. 1 is a side view of an automobile, with parts broken away to show my improved heater and windshield defroster applied thereto.

Fig. 2 is a sectional view, on a larger scale, through the heater and windshield defroster structure.

Fig. 3 is a fragmentary view showing the air flow controlling valve in a different position from that shown in Fig. 2.

Fig. 4 is a view similar to Fig. 3, but showing the valve in another position.

The reference numeral 10 indicates the body of an automobile having a windshield 12, and 14 is the usual dash separating the engine compartment from the body compartment. Mounted in any suitable manner upon the dash inside the body compartment is a heat radiating member 16 which may be of any desired form, but which in the drawing is shown as being of annular form, being composed of annular concentrically arranged tubes 18 through which hot water from the engine cooling circulating system is adapted to flow, and radially extending heat radiating fins 20 formed on or secured to the tubes, the fins being spaced from each other to form air passages between them. One form of this general type of heater construction is shown in the patent to Karmazin 1,761,397, but other forms may be used with equally satisfactory results.

Mounted in the opening 22 in the center of the annular heat radiating member is an electric motor 24 which drives a fan 26 located in a housing 28 secured to one end of the heat radiating member. The housing 28 has a large opening 30 formed in it, and one or more deflectors 32 pivotally secured to the housing may be adjusted to different positions to either close the opening 30, or to deflect air discharged through the opening by the fan in any desired direction.

Extending through a hole formed in the dash and communicating with the opening 22 in the center of the heat radiating member is one branch 34 of a T-shaped conduit 36, the opposite branch 38 of which has a tube 40 connected to it, this tube extending forwardly through the engine compartment, and having its open end 42 disposed at some point at the front of the car, such as behind the radiator grille 44, where air will be forced into it by the forward movement of the car.

Extending upwardly from the conduit 36 is a branch 46 which communicates with the inlet side of a blower 48 which is driven by an electric motor 50. A tube 51 connected to the discharge side of the blower extends rearwardly through an opening in the dash, and branches 52 and 54 connected to this tube conduct the air from the blower up to discharge nozzles 56 located at the inside lower edge of each side of the windshield.

Supported on a shaft 58, which is pivotally mounted in the conduit 36 at the intersection of the center lines of the branches 34—38 and 46, is a valve 60 which is of such size and shape that when it is set to the position shown in Fig. 2, it will entirely close off the passage in the branch 34 but will permit air to flow from the branch 38 into the branch 46 and thence into the blower. When the valve is set to the position shown in Fig. 3, air may flow from the branch 38 into both the branches 34 and 46, and when it is set to the position shown in Fig. 4, the passageway in the branch 38 is closed off, but air may flow from the branch 34 into the branch 46 and thence into the blower. To permit changing the position of the valve from the operator's seat, a lever 62 is connected to one end of the shaft 58 on the outside of the conduit 36, and a rod 64 extends up through or adjacent to the instrument panel 66, where an operating handle 68 is provided on the end of the rod.

When it is desired to heat the car, the valve 60 will ordinarily be set to the position shown in Fig. 2, the deflectors 32 will be adjusted to open position and the motor 24 will be actuated to drive the fan 26. This will cause air to be drawn in radially through the passages between the heater fins 20, and the air after becoming heated will be discharged through the opening 30 in the face of the heater, the deflectors 32 being adjusted to the proper angular position to cause the heated air to flow in any desired direction. This form of operation of the heater structure insures a quick warm-up of the interior of the car, since the air being heated is recirculated air taken from within the car body, and the action of the fan causes a large quantity of air to flow through the heater in a short time.

After the air within the car body has been brought up to the desired temperature, the motor 24 may be shut off, and the car may be heated with fresh air taken from outside the body. To do this, the deflectors 32 are adjusted to a position wherein they will close the opening 30 in the heater housing, and the valve 60 is set to the position shown in Fig. 3, whereupon air being forced into the open end 42 of the tube 40 by the forward movement of the car will flow through that tube and through the branches 38 and 34 into the opening 22 in the center of the heat radiating member 16, and will then flow outwardly in a radial direction through the passages between the fins 20, becoming heated thereby. It will be seen that the interior of the car body will thus be heated by a diffused flow of heated fresh air taken from outside the body, without requiring the operation of the motor driven fan.

It will be understood, of course, that the heater may be operated in the manner described in the preceding paragraph only when the car is being driven at a fairly rapid rate of speed, and that if it is desired to heat the interior of the body when the car is standing still or is moving slowly, it will be necessary to set the valve 60 to the position shown in Fig. 2, to open the deflectors and to operate the fan 26 to provide an adequate flow of air to properly heat the car. Also in extremely cold weather, it may be necessary to continue the operation of the fan in order to obtain the desired amount of heated air.

When it is desired to defrost the windshield with unheated air, the valve 60 is set in the position shown in Fig. 2, and outside air being forced into the tube 40 by the forward movement of the car will be caused to flow upwardly through the branch 46, through the blower housing, the tube 51, the branches 52 and 54 and the nozzles 56, from which it will be discharged against the inner surface of both sides of the windshield to remove frost or condensed vapor. Should the amount of air being forced into the tube 40 by the forward movement of the car be insufficient to accomplish this purpose, the motor 50 may be actuated to drive the blower 48, which will of course serve to greatly increase the amount and velocity of the air being discharged through the nozzles 56.

Under some conditions, such as when there is frost on the inside surface of the windshield, or snow or ice on the outside thereof, it is advisable to utilize heated air for windshield defrosting purposes. When this is desired, the valve 60 is set to the position shown in Fig. 4, the deflectors 32 are adjusted to closed position, and the blower 48 is driven by the motor 50. It will be seen that this will cause air to be drawn in radially through the passages between the heater fins 20, which are will flow from the opening 22 in the center of the heat radiating member, through the branches 34 and 46 into the blower housing, and thence through the tube 51 and branches 52 and 54 out through the discharge nozzles 56.

When the valve 60 is in the position shown in Fig. 3, some of the outside air being forced in through the tube 40 may flow upwardly through the branch 46 and blower housing to the windshield, and the balance may flow into the heat radiating member. It will be seen, therefore, that many different combinations of heating the interior of the car body with either recirculated air or fresh air from outside, either with or without requiring the operation of the fan, or defrosting the windshield with either heated or unheated air, may be obtained.

While the structure consisting of the blower 48, tube 51, branches 52 and 54 and discharge nozzles 56 has been described as being utilized to defrost the windshield, it should be understood that it may also be used for the purpose of ventilating the interior of the car, since the air discharged from the nozzles, after passing upwardly over the inner surface of the windshield, flows rearwardly into the body compartment causing a circulation of air therethrough. When the structure is used for car ventilating purposes, the blower may or may not be operated, as desired, depending upon whether the amount of outside air being forced in by the forward movement of the car is sufficient, in the same manner as when the structure is being utilized for windshield defrosting purposes.

It will be understood, of course, that if necessary any suitable type of valve may be provided in the tube 40, in the branches 38 or 46, or in the tube 51 to prevent the flow of outside air through these tubes except when desired.

An advantage of locating the defroster part of the structure in the engine compartment is that it does not occupy space within the body compartment which is needed for other purposes, and permits making the heater part of the structure of adequate size to properly heat the interior of the car under all conditions, while permitting the overall dimensions of the part of the structure which is located inside the body compartment to be kept within such limits as not to occupy too much of the passenger space or space which is needed for other parts of the vehicle.

While the invention is susceptible of various modifications and alternative constructions, I have shown in the drawing and have described in detail the preferred embodiment, but it is to be understood that I do not thereby intend to limit the invention to the specific form disclosed, but intend to cover all modifications and alternative constructions falling within the spirit and scope of the invention as defined in the appended claims.

I claim:

1. In combination with a motor vehicle having a dash separating the engine compartment from the body compartment and a windshield, a heating structure located in the body compartment, a conduit extending through the dash into communication with the heating structure and adapted to supply fresh air from outside the vehicle to the heating structure, a windshield defrosting structure including a blower, said blower being located in the engine compartment, said blower being connected to said conduit and being adapted to withdraw air therefrom, and adjustable means located in said conduit, which means when set in one position will allow unheated air from outside the vehicle to flow into the defrosting structure and when set in another position will allow heated air from the heating structure to be drawn into the defrosting structure by said blower.

2. In combination with a motor vehicle having a dash separating the engine compartment from the body compartment and a windshield, a heating device located in the body compartment, a conduit located in the engine compartment and extending through the dash into communication with the heating device, a tube serving to supply air from outside the body compartment to the conduit, a blower having its inlet side connected to said conduit and its outlet side connected to a passageway leading to the windshield, and adjustable means located in said conduit adapted to allow said blower to withdraw either heated air from the heating device or unheated air from outside the body compartment.

3. In combination with a motor vehicle having a windshield, a heating device adapted to heat the interior of the vehicle, a conduit communicating with said heating device, means adapted to supply air from outside the vehicle to the conduit, a tube connected to said conduit and serving to conduct air therefrom to the windshield, and a valve located in said conduit, said valve being adapted when adjusted to one position to cause heated air from the heating device to flow through the tube to the windshield, when set in another position to cause unheated air from outside of the vehicle to flow through the tube to the windshield, and when set in a third position to cause air from outside the vehicle to flow through the conduit into the heating device.

HAROLD A. REYNOLDS.